Patented July 10, 1945

2,380,019

UNITED STATES PATENT OFFICE 2,380,019

AZEOTROPIC DISTILLATION

Ward J. Bloomer, Westfield, N. J., assignor to The Lummus Company, New York, N. Y., a corporation of Delaware Application February 9, 1942, Serial No. 430,147

14 Claims. (Cl. 202—42)

This invention relates to the separation of mixtures of close boiling compounds by azeotropic distillation, and more specifically relates to the separation of styrene from natural or synthetic mixtures of which it is a part.

Styrene has become a highly important industrial chemical as the foundation for the synthesis of many products including various plastics and resins such as synthetic rubber and the like. Its unsaturated character and its tendency to polymerize are particularly useful in this art. With an increase in demand for many plastics and synthetic rubber, it has become necessary to produce styrene of a relatively high degree of purity or concentration in very large quantities at a relatively low cost. Generally, a concentration of fifty to sixty per cent is sufficient in the production of many plastics and resins; but a concentration of eighty-five per cent or more is usually necessary in the production of synthetic rubber such as the butadiene styrene polymer type.

Styrene is commonly found as a constituent of drip oil or the light oil condensate obtained in the production of artificial gas, and in such oil it is associated with other close boiling compounds of an aromatic type. The closeness of boiling points and the complexity of the mixture make it substantially impossible to satisfactorily separate the styrene even by superfractionation to obtain a sufficient yield of the required concentration. Styrene may also be obtained by the dehydrogenation of ethyl benzene, but the proportions and characteristics of the associated ethyl benzene and other close boiling constituents also render the separation of the styrene by distillation extremely difficult.

The principal object of my invention is to provide an improved method for the recovery of styrene from natural or synthetic mixtures of close boiling hydrocarbons containing styrene in which substantial quantities of styrene can be recovered of nearly 100% concentration.

Another object of my invention is to provide an improved method for the substantially complete recovery of styrene from natural or synthetic mixtures of close boiling hydrocarbons containing styrene in which the styrene recovered is of a high concentration.

More particularly, it is an object of my invention to separate mixtures of close boiling hydrocarbons having eight or more carbon atoms per molecule by the use of azeotropic agents with a high degree of yield and concentration of the desired products and with a minimum of expense and difficulty of recovery of the entraining agent.

A further object of my invention is to provide a new method of separating mixtures of close boiling aromatic compounds by the use of ternary azeotropic mixtures including water, with a continuous recycle of the water and azeotropic entrainer to eliminate the customary concentration steps.

Further objects and advantages of my invention will appear from the following description of preferred forms of embodiment thereof taken in connection with the attached drawings, illustrative thereof, in which.

I have found that I can obtain substantially pure styrene in relatively large quantities by the azeotropic distillation of styrene-containing mixtures. As an example, I have fractionally distilled a light oil which has approximately the following analysis:

|  | Wt. percentage | B. P., °F. |
|---|---|---|
| Ethyl benzene | 2 | 277.0 |
| Meta-xylene | 35 | 278.0 |
| Para-xylene | 13 | 281.1 |
| Ortho-xylene | 5 | 291.0 |
| Styrene | 22–27 | 294.8 |
| Propyl benzenes | 10 | 306.0 |
| Trimethyl benzenes |  | 315.0 |
| Olefins (135–160° C.) | 2 | 328.0 |
| Paraffins | 5 | 356–401 |
|  | 2 | 356–401 |

High boiling compounds—less than 1%.

Figure 2:
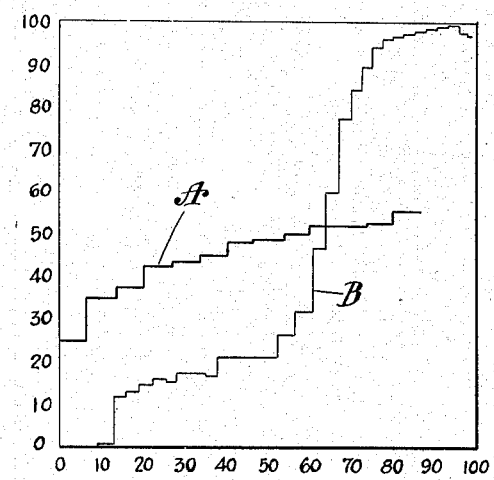
Fig. 2 is a graphical comparison of the separation of a crude styrene mixture by my improved procedure with customary procedure.

Ordinary fractional distillation of this material proves quite unsatisfactory. As shown in Fig. 2, Curve A represents the results of an ordinary fractionation and, as will be observed, the maximum concentration which was obtained was 60% and the yield of material of 54% concentration was only 23%. Larger yields are obtained at the sacrifice of degree of concentration. This is in accordance with the best commercial practice, but it is very much lower than I have been able to accomplish in accordance with this invention.

I have found that acetic acid as an azeotropic agent is of particular benefit. The acetic acid, which is a polar compound, appears to have a depressing effect on the boiling points of the like boiling hydrocarbons so that the initial overhead is substantially free of styrene, and a styrene fraction of a high degree of concentration can be obtained as a subsequent overhead. An example of this is shown in Curve B in Fig. 2. The concentration of the styrene-containing overhead reaches nearly 100%, and yields as high as 75.8% of styrene of 61.7% concentration can be obtained. Other typical yields of higher concentration products are 60.1% of 72.9% concentration and 12.8% of 99.0% concentration. Azeotropic distillation, however, involves not only the initial distillation with the azeotropic agent, but it also requires an economical use of the azeotropic agent and an efficient recovery of the azeotropic agent employed. Furthermore, in order to be commercially successful on a large scale, it is necessary that the operation be continuous.

Figure 1:
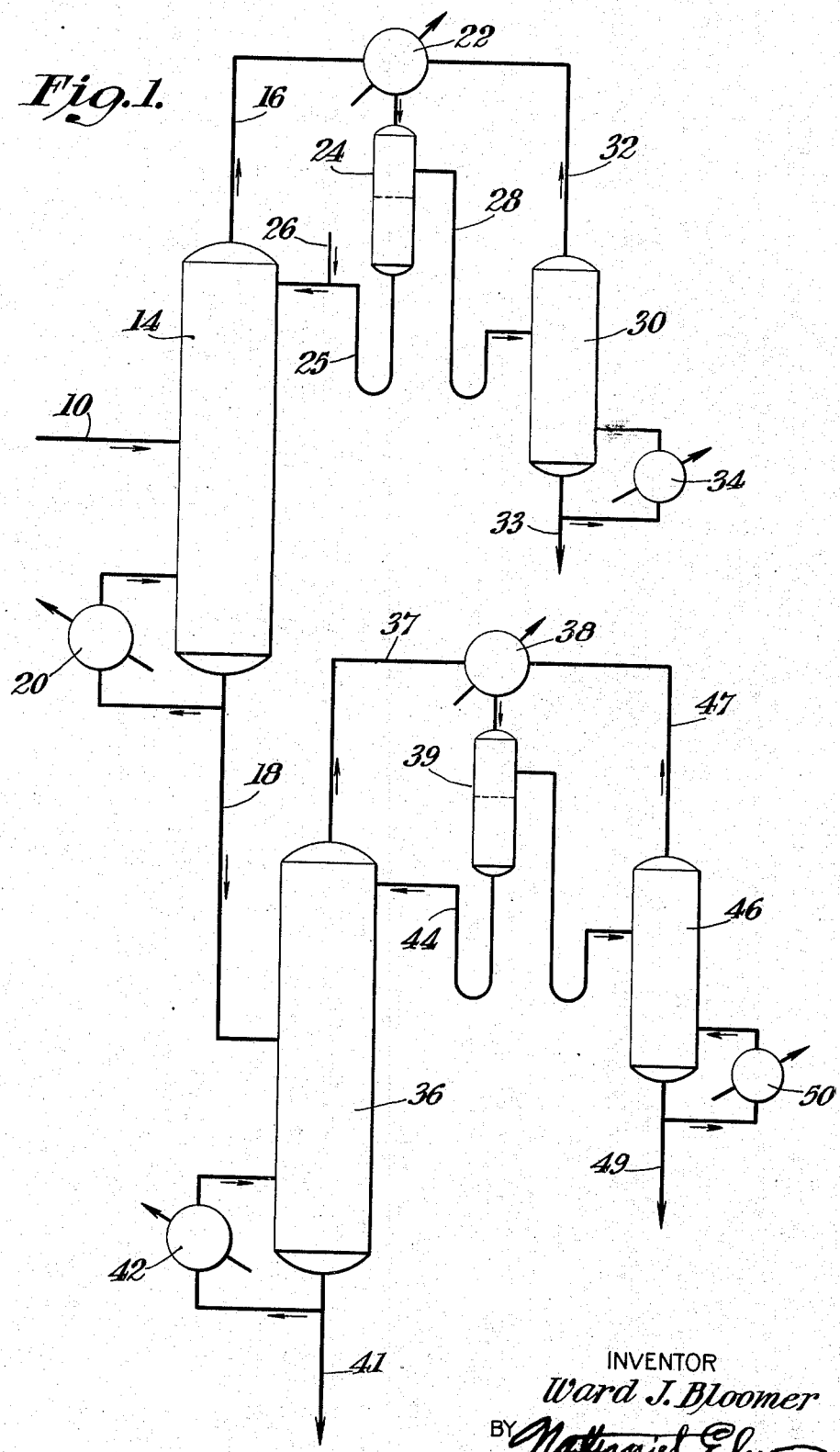
Fig. 1 is a diagrammatic view of a continuous distillation system.

I have, therefore, shown in Fig. 1 a complete continuous distillation system for the recovery of styrene from a mixture containing the same and like-boiling hydrocarbons including ethyl benzene, the xylenes, and propyl benzene.

In the commercial practice of my invention, I find that it is particularly desirable to use water with the azeotropic agent to provide for economical separation and recovery of the azeotropic agent from the hydrocarbons associated therewith in the overhead distillate.

In accordance with a preferred form of embodiment of my invention, I introduce a crude styrene fraction such as that obtained from drip oil through line 10 into the fractionating tower (Fig. 1). This tower is preferably provided with bubble decks to effect the desired separation. In tower 14 the styrene fraction is subjected to distillation in the presence of acetic acid, a solution of which in water of suitable concentration may be conveniently used. A ternary acetic acid-water-hydrocarbon azeotropic mixture is taken off overhead through line 16 for condensation in condenser 22. Upon condensation, this azeotropic mixture separates in separator 24 into two layers, an upper hydrocarbon layer and a lower aqueous acetic acid layer. The lower acetic acid layer is returned to tower 14 through line 25 as reflux. In this manner the acetic acid is continuously cycled in a closed circuit, which includes tower 14. Make-up acetic acid may be introduced into the system through line 26 as necessary.

The upper hydrocarbon layer is removed through line 28 and introduced into a secondary distillation tower 30, in which the hydrocarbon material is freed of any acetic acid retained therein. The acetic acid along with any water admixed with the upper hydrocarbon layer is taken off overhead through line 32 for condensation in condenser 22. The resulting condensate is passed to separator 24 along with the overhead condensate from tower 14. Substantially acid-free hydrocarbons are removed as a bottoms stream through line 33. This stream comprises a substantial proportion of the low boiling hydrocarbons, principally the isomeric xylenes, initially admixed with the styrene and may contain a very small proportion of the styrene unavoidably carried off overhead from tower 14. A portion of the bottoms stream in line 33 may be recycled through reboiler 34 to supply heat to tower 30.

The bottoms stream from tower 14 is removed through line 18 and comprises substantially all the styrene along with a small proportion of the lower boiling hydrocarbons as well as the higher boiling hydrocarbons. If desired, a portion of this concentrated styrene bottoms stream may be recycled through reboiler 20 for supplying heat to tower 14.

In the operation of this continuous process sufficient acetic acid and water are introduced through line 26 at the beginning of operations to provide the necessary amounts of these materials to form the desired ternary azeotrope removed overhead through line 16. Desirably, the distillation is carried out under sufficient vacuum to prevent the bottoms temperature from rising so high as to cause undue polymerization of the styrene. At an absolute pressure of 75 mm. Hg, the overhead in line 16 comprises approximately 42.3% hydrocarbons (primarily xylenes), 39.6% acetic acid, and 18.1% water by volume. The temperature of this overhead is approximately 111° F. The upper hydrocarbon layer in separator 24, when the separation is effected at 68° F., comprises 45.5% by volume of the ternary azeotropic overhead and contains 90.1% hydrocarbons, 9.0% acetic acid, and 0.9% water by volume. The lower aqueous acetic acid layer in separator 24 comprises 54.5% by volume of the ternary azeotropic overhead and contains 2.2% hydrocarbons, 65.3% acetic acid, and 32.5% water by volume. Make-up of the aqueous acetic acid to offset losses due to handling and the like amounts to approximately 0.05% daily.

The styrene-containing fraction removed through line 18 may be used in the manufacture of polystyrene, or if concentrated styrene is desired, it can be introduced into tower 36 and further fractionated therein. For this purpose, I find aqueous acetic acid to be helpful as in the operation of tower 14. In this case, a ternary azeotrope comprising water, acetic acid, and hydrocarbons (primarily styrene) is removed overhead through line 37 and is condensed in condenser 38. The resulting condensate is introduced into the separator 39, wherein it separates into an upper hydrocarbon layer and a lower aqueous acetic acid layer. The bottoms stream removed through line 41 from tower 36 comprises substantially all of the higher boiling hydrocarbons and other material which have been separated from the styrene. A portion of this bottoms stream may be passed through reboiler 42 to supply heat to tower 36.

The lower aqueous acetic acid layer from separator 39 is returned through line 44 to tower 36 as reflux. This lower layer consists primarily of water and acetic acid but also contains a small amount of hydrocarbons. The upper hydrocarbon layer is removed from separator 39 and is fractionated in the secondary tower 46 to free the hydrocarbons of any acetic acid and water admixed therewith. The acetic acid and water are taken off overhead through line 47 for condensation in condenser 38. The bottoms stream comprising styrene of the desired degree of concentration is removed through line 49. A portion of this bottoms stream may be recycled through reboiler 50 to supply heat to tower 46.

This bottoms stream may have a concentration greater than 85%.

I have found acetic acid eminently satisfactory for this purpose. When glacial acetic acid is used as the azeotropic agent, the overhead distillate contains approximately four parts of glacial acetic acid for each part of hydrocarbons by volume. When aqueous acetic acid is used, however, I find that the addition of water reduces the ratio of acetic acid to hydrocarbons in the overhead distillate to approximately 1:1 or less. With the use of acetic acid, it is appropriate to use a stainless steel containing approximately 18% nickel, 8% chromium and several per cent of molybdenum for the fractionating equipment to avoid corrosion difficulties.

I have also used other lower fatty acids such as propionic acid and butyric acid as the azeotropic agent in the concentration of styrene from crude styrene-containing mixtures. In general, the lower fatty acids used should have boiling points within 30° or 40° C. of the boiling range of the hydrocarbon to be separated; they should be preferably completely soluble in water and preferentially less soluble in the hydrocarbon at room temperature; they should be completely soluble in the hydrocarbon at distillation temperatures; they should be non-reactive with the hydrocarbons; and they should be reasonably inexpensive and obtainable in a sufficiently pure state.

Figure 3:
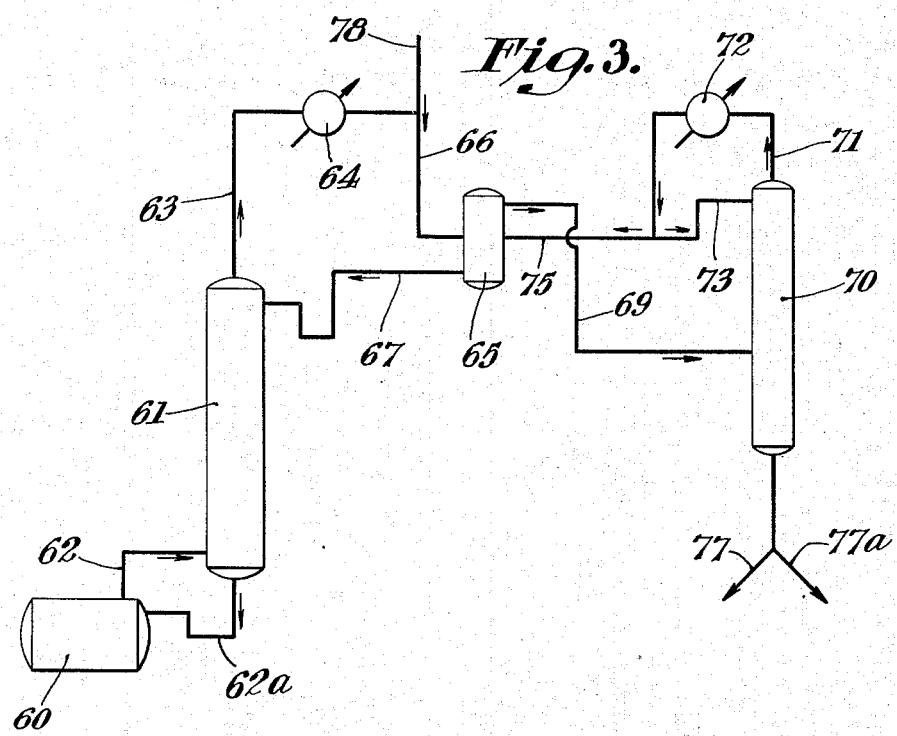
Fig. 3 is a diagrammatic view of a batch distillation system.

In some cases, it may be desirable to carry out my improved styrene recovery process in a batch operation. In such case, the crude styrene fraction is introduced into the still 60 of Fig. 3 along with a sufficient amount of the desired azeotrope-forming agent such as aqueous acetic acid. The vapors generated in still 60 are introduced into the bottom of tower 61 through line 62. A ternary azeotrope comprising hydrocarbons, acetic acid and water is removed overhead through line 63 for condensation in condenser 64. As the distillation proceeds, the composition of the hydrocarbons in this ternary azeotropic overhead gradually changes since the low boiling hydrocarbons are vaporized first and the styrene second. The composition of the overhead with respect to the percentages of hydrocarbons, acetic acid and water is approximately the same as that of the overhead in line 16 in Fig. 1 during the removal of the xylenes under substantially the same conditions. The bottoms from tower 61 is returned to still 60 through line 62a.

The condensate from condenser 64 is passed to the separator 65 through line 66 wherein it separates sharply into an upper hydrocarbon layer which is substantially free of acetic acid and a lower aqueous acetic acid layer. This lower layer is returned as reflux for tower 61 through line 67. The upper hydrocarbon layer may be removed as a product and caustic-washed, or it may be passed through line 69 into the secondary tower 70, wherein the hydrocarbons are freed from any acetic acid and water admixed therewith. The overhead in line 71 from tower 70 comprises primarily acetic acid and water and a small amount of hydrocarbons and is condensed in condenser 72, and a portion of the condensate formed is returned in line 73 to column 70 as reflux. The remainder of the condensate is returned through line 75 to the separator 65. Alternatively, a common condenser and separator may be used to handle the overhead streams from towers 61 and 70.

The initial bottoms stream removed from tower 70 comprises low-boiling hydrocarbons (primarily xylenes) substantially free of styrene. As the distillation proceeds, however, and the composition of the hydrocarbons in the overhead from tower 61 changes, the bottoms stream from tower 70 gradually contains increasing percentages of styrene. Accordingly, line 77 is provided for removal of the initial bottoms stream produced by tower 70, and line 77a is provided to remove the subsequent stream containing the increased proportions of styrene fraction. If a styrene of approximately 60% concentration is desired as the end product, this flow arrangement is most efficient.

In the starting up of the operation of this batch system, the aqueous acetic acid may be introduced into the system through line 78 if desired. This line may also serve for the introduction of make-up acetic acid when necessary during operation.

Fig. 2 gives a graphical comparison of the ordinary distillation of a crude styrene fraction and the distillation thereof according to my improved azeotropic method. The data in Fig. 2 were from the crystallization of a heart cut of drip oil initially containing 47.3% by weight of styrene. The maximum concentration, as shown at A, without entrainer was 56%, and the yield was negligible. The advantages of using acetic acid, as shown at B, is readily apparent.

It is, of course, to be understood that the temperature limitations on the distillation of styrene are critical as the material polymerizes readily.

I have also found that other sources of styrene can be equally as well treated by azeotropic distillation using a ternary azeotrope including water. For example, in a plant to process 8000 pounds per hour of synthetic styrene mixture of the following composition, it was estimated that the saving in initial cost would be nearly 10%. The utility saving is also great as the concentration of the acetic acid or other entrainer is unnecessary when the material so sharply separates that it can be recycled continuously in the system. The synthetic styrene mixture considered had the following composition:

| | Per cent |
|---|---|
| Benzene | 7.33 |
| Toluene | 5.50 |
| Ethyl benzene | 62.18 |
| Styrene | 20.30 |
| High boilers | 4.80 |

In accordance with my process, whether batch or continuous, it is not only possible to obtain high concentration styrene, which is highly important at this time, but it is also possible to obtain substantial purity of the other materials such as the xylenes which also have important industrial uses. It is also possible to obtain indene, methyl styrene and other unsaturated hydrocarbons from mixtures thereof.

It is, of course, to be understood that the process is commonly operated under a substantial vacuum, and the necessary vacuum lines, pumps, controls, etc. would be used in a practical installation, the flow diagrams being diagrammatic in form but sufficient for one skilled in the art to practice the invention. It is also to be understood that the invention is not to be considered to be limited to the data given which are merely in the form of examples and that it is contemplated that variations in composition and steps are within the purview of the inventive concept.

I claim:

1. The process of recovering a concentrated vinyl benzene hydrocarbon fraction from a mixture thereof primarily with close boiling saturated benzene hydrocarbons having at least one saturated side chain, which comprises subjecting such mixture to azeotropic distillation in the presence of an azeotrope-forming agent selected from the group consisting of the lower fatty acids having from two to four carbon atoms, removing as the overhead from such distillation a binary azeotrope primarily of saturated side chain benzene hydrocarbons and the lower fatty acid, and removing the concentrated vinyl benzene hydrocarbon fraction as the bottoms stream from such distillation.

2. The process of recovering a concentrated styrene fraction from a mixture thereof primarily with close boiling saturated benzene hydrocarbons having at least one saturated side chain, which comprises subjecting such mixture to azeotropic distillation in the presence of an azeotrope-forming agent selected from the group consisting of the lower fatty acids having from two to four carbon atoms, removing as the overhead from such distillation a binary azeotrope primarily of saturated side chain benzene hydrocarbons and the lower fatty acid, and removing the concentrated styrene fraction as the bottoms stream from such distillation.

3. The process for the refining of drip oil to recover the styrene contained therein from the associated mixture of the close boiling materials of aromatic and aliphatic nature, which comprises introducing acetic acid and water into the mixture and fractionally distilling the mixture, and removing a ternary azeotrope of acetic acid, water and hydrocarbon, in which the hydrocarbon is predominantly a saturated aromatic hydrocarbon.

4. In the azeotropic distillation of mixtures of ethyl benzene and styrene to recover styrene, the improvement which consists in adding acetic acid and water to the initial mixture whereby the initial overhead is substantially styrene-free and a subsequent cut is predominantly styrene.

5. The process of recovering a concentrated styrene fraction from a mixture thereof primarily with xylenes, which comprises subjecting such mixture to azeotropic distillation in the presence of acetic acid, removing as the overhead from such distillation a binary azeotrope of primarily xylenes and the acetic acid, and removing the concentrated styrene fraction as the bottoms stream from such distillation.

6. The process as claimed in claim 5, in which the mixture of styrene and the xylenes is obtained from the drip oil.

7. The process of recovering a concentrated styrene fraction from a mixture thereof primarily with ethyl benzene, which comprises subjecting such mixture to azeotropic distillation in the presence of acetic acid, removing as the overhead from such distillation a binary azeotrope of primarily ethyl benzene and the acetic acid, and removing the concentrated styrene fraction as the bottoms stream from such distillation.

8. The process as claimed in claim 7, in which the mixture of styrene and ethyl benzene is obtained from the dehydrogenation of ethyl benzene.

9. The process of recovering a concentrated vinyl benzene hydrocarbon fraction from a mixture thereof primarily with close boiling saturated benzene hydrocarbons having at least one saturated side chain, which comprises subjecting such mixture to azeotropic distillation in the presence of an azeotrope-forming agent comprising an aqueous solution of a lower fatty acid having from two to four carbon atoms, removing as the overhead from such distillation a ternary azeotrope primarily of saturated side chain benzene hydrocarbons, the lower fatty acid, and the water, and removing the concentrated vinyl benzene hydrocarbon fraction as the bottoms stream from such distillation.

10. The process of recovering a concentrated styrene fraction from a mixture thereof primarily with close boiling saturated benzene hydrocarbons having at least one saturated side chain, which comprises subjecting such mixture to azeotropic distillation in the presence of an azeotrope-forming agent comprising an aqueous solution of a lower fatty acid having from two to four carbon atoms, removing as the overhead from such distillation a ternary azeotrope primarily of saturated side chain benzene hydrocarbons, the lower fatty acid, and the water, and removing the concentrated styrene fraction as the bottoms stream from such distillation.

11. The process of recovering a concentrated styrene fraction from a mixture thereof primarily with xylenes, which comprises subjecting such mixture to azeotropic distillation in the presence of aqueous acetic acid, removing as the overhead from such distillation a ternary azeotrope of primarily xylenes, the acetic acid, and the water, and removing the concentrated styrene fraction as the bottoms stream from such distillation.

12. The process as claimed in claim 11, in which the mixture of styrene and the xylenes is obtained from drip oil.

13. The process of recovering a concentrated styrene fraction from a mixture thereof primarily with ethyl benzene, which comprises subjecting such mixture to azeotropic distillation in the presence of aqueous acetic acid, removing as the overhead from such distillation a ternary azeotrope of primarily ethyl benzene, the acetic acid, and the water, and removing the concentrated styrene fraction as the bottoms stream from such distillation.

14. The process as claimed in claim 13, in which the mixture of styrene and ethyl benzene is obtained from the dehydrogenation of ethyl benzene.

WARD J. BLOOMER.

DISCLAIMER 2,380,019.—*Ward J. Bloomer*, Westfield, N. J. AZEOTROPIC DISTILLATION. Patent dated July 10, 1945. Disclaimer filed Nov. 27, 1946, by the assignee, *The Lummus Company*.

Hereby enters this disclaimer to claims 5 and 6 in said specification.

[*Official Gazette January 7, 1947.*]